(12) United States Patent
Schrijen et al.

(10) Patent No.: US 8,176,106 B2
(45) Date of Patent: May 8, 2012

(54) ON-CHIP ESTIMATION OF KEY-EXTRACTION PARAMETERS FOR PHYSICAL TOKENS

(75) Inventors: Geert Jan Schrijen, Eindhoven (NL); Boris Skoric, Den Bosch (NL)

(73) Assignee: NXP B.V., Eindhoven (NL)

( * ) Notice: Subject to any disclaimer, the term of this patent is extended or adjusted under 35 U.S.C. 154(b) by 996 days.

(21) Appl. No.: 12/097,584

(22) PCT Filed: Dec. 12, 2006

(86) PCT No.: PCT/IB2006/054758
§ 371 (c)(1),
(2), (4) Date: Jun. 16, 2008

(87) PCT Pub. No.: WO2007/069190
PCT Pub. Date: Jun. 21, 2007

(65) Prior Publication Data
US 2008/0262788 A1    Oct. 23, 2008

(30) Foreign Application Priority Data
Dec. 14, 2005 (EP) .................... 05112117

(51) Int. Cl.
*G06F 1/02* (2006.01)
*G06F 7/04* (2006.01)
*H04L 9/32* (2006.01)

(52) U.S. Cl. ............... 708/250; 713/179; 726/9; 726/20

(58) Field of Classification Search ............ 708/250, 708/255; 726/2, 9, 20
See application file for complete search history.

(56) References Cited

U.S. PATENT DOCUMENTS
2006/0104484 A1* 5/2006 Bolle et al. .................. 382/115
2007/0180261 A1* 8/2007 Akkermans et al. ........ 713/186
2008/0112596 A1* 5/2008 Rhoads et al. ............... 382/115

OTHER PUBLICATIONS

Linnartz, J-P; et al "New Shielding Functions to Enhance Privacy and Prevent Misuse of Biometric Templates" Lecture Notes in Computer Science, Springer Verlag, Berlin, DE, vol. 2688, 2003, pp. 393-402.
Verbitsky, E; et al "Reliable Biometric Authentication With Privacy Protection" Proceedings of the Symposium on Information and Communication Theory in the Benelux, 2003, pp. 125-132.
Skoric, B; et al "Robust Key Extraction From Physical Uncloneable Functions" Applied Cryptography and Network Security Lecture Notes in Computer Science; LNCS, Springer Verlag, BE, vol. 3531, Jan. 26, 2005, 407-422.
Tuyls, Pim; et al "Capacity and Examples of Template-Protecting Biometric Authentication Systems" Lecture Notes in Computer Science, Springer Verlag, Berlin, DE, vol. 3087, May 15, 2004, pp. 1-13.
Tuyls, Pim; et al "Information-Theoretic Security Analysis of Physical Uncloneable Functions" Lecture Notes in Computer Science, Aug. 5, 2005, pp. 1-15.

* cited by examiner

*Primary Examiner* — Chuong D Ngo

(57) ABSTRACT

The present invention relates to a method and a device (11) using a physical token (14), which provides measurable parameters, to derive at least one data set. A plurality of values of one or more of the parameters are measured. From these measured values, a measure of variance is calculated. Quantization intervals into which a measured value is to be quantized are then determined. A possible value of a data set, which subsequently can be derived from a measured value provided by the physical token, is associated with each quantization interval. Further, information which subsequently enables determination of these quantization intervals is stored. Hence, an enrolling phase has been completed. When the preparing phase has been completed, a deriving phase may commence. When a data set is to be derived, for example to be used as a cryptographic key, a value of any one of the parameters provided by the PUF is measured. This measured value is quantized into a determined quantization interval, and a data set may be derived from the quantization interval into which the measured value is quantized.

26 Claims, 3 Drawing Sheets

ON-CHIP ESTIMATION OF KEY-EXTRACTION PARAMETERS FOR PHYSICAL TOKENS

FIELD OF THE INVENTION

The present invention relates to a method of using a physical token, which provides measurable parameters, to derive at least one data set. The invention further relates to a device comprising a physical token that provides measurable parameters, said device being arranged to derive at least one data set from said measurable parameters.

BACKGROUND OF THE INVENTION

A Physical Uncloneable Function (PUF) is a structure used for creating a tamper-resistant environment in which parties may establish shared secrets and/or cryptographic material such as encryption keys. A PUF is a physical token to which an input—a challenge—is provided. When the challenge is provided to the PUF, it produces a random analog output referred to as a response. Because of its complexity and the physical laws it complies with, the token is considered to be 'uncloneable', i.e. unfeasible to physically replicate and/or computationally model. A PUF is sometimes also referred to as a Physical Random Function. A PUF can be substantially strengthened if it is combined with a control function. In practice, the PUF and an algorithm that is inseparable from the PUF are comprised within a tamper-resistant chip, a so-called controlled PUF (CPUF). The PUF can only be accessed via the algorithm and any attempt to by-pass or manipulate the algorithm will destroy the PUF. The algorithm, which is implemented in hardware, software or a combination thereof, governs the input and output of the PUF. For instance, frequent challenging of the PUF is prohibited, certain classes of challenges are prohibited, the physical output of the PUF is hidden, only cryptographically protected data is revealed, etc.

A PUF can be used as a generator of cryptographic key material in that bit strings may be derived from the output of the PUF. An example of such a PUF is a 3D optical medium containing light scattering elements at random positions. An input—i.e. a challenge—to the optical medium can e.g. be angle of incidence of a laser beam that illuminates the PUF, and an output—i.e. a response—is a speckle pattern created by the light scattering elements as a result of a particular angle of incidence. This response may be detected with a camera and quantized into a cryptographic key. Another way of creating a PUF that may be used as a source of cryptographic key material is to cover an integrated circuit (IC) with a coating in which dielectric particles are interspersed. These particles typically have different dielectric constants and more or less random shapes, dimensions and locations due to production processes. Sensor elements are arranged at a top metal layer of the IC to locally measure capacitance values at different coating positions. In this example, the coating itself constitutes a physical uncloneable function. As a result of the random nature of the dielectric particles, the measured capacitance values make excellent key material. The IC provided with a PUF in the form of a coating measures capacitances and converts the capacitance values into bit strings from which the cryptographic keys are derived. An important security requirement when converting the capacitance values into bit strings is that the bit strings are uniformly distributed. Hence, if m-bit key strings are derived by the IC, all possible m-bit strings should be equally probable. This way the derived cryptographic keys have full m-bit entropy and the best an attacker can do is to guess a correct key with a probability $2^{-m}$.

In practice, the distribution of measured capacitance values for a large set of apparently identical coating PUFs will not be uniform. Typically, the measured values will correspond to a Gaussian (normal) distribution or a binomial distribution. The distribution of capacitance values, for a set of coating PUFs, measured at different positions of the respective coating PUF (i.e. interclass distribution) follows a distribution with a mean value $\mu$ and standard deviation $\Sigma$. Further, when a measurement at a particular position of a particular coating PUF is repeated multiple times, the measured capacitance values will differ as a result of measurement noise such as temperature variations, stray electromagnetic fields, etc, even though they theoretically should be identical. Hence, the distribution of capacitance values measured at a certain coating location i of a certain PUF j (i.e. intraclass distribution) follows a distribution with a mean $\mu_{ij}$ and standard deviation $\sigma_{ij}$.

A way of attaining uniformity among the derived cryptographic keys is to quantize the measured capacitance values into equiprobable intervals during an enrollment phase. Thus, the capacitance values are divided into quantization intervals in a manner such that the probability of each interval, i.e. the area constrained by a capacitance value probability density function and the two interval boundaries of each respective interval, is the same for each quantization interval. As a consequence, when a specific coating PUF is randomly selected and measured among a set of coating PUFs, each key has an equal probability of being derived after quantization. Further, the intraclass distribution, i.e. the distribution of capacitance values that is a result of repeated measurements at a certain coating location of a certain PUF, must be taken into account. This is achieved by considering the statistics of the intraclass distribution and using these statistics when defining the quantization intervals.

In order to define appropriate quantization levels when converting analog capacitance values into digital cryptographic keys, the distribution of capacitance values over a large set of coating PUFs must be known. In the production process of the coating PUFs, this is a problem. When a first batch of coating PUFs is produced, the quantization boundaries cannot immediately be programmed into the IC of the respective PUF, since statistics about the distribution of capacitance values for this batch must be obtained by measuring a large number of PUFs. After a sufficiently large number of PUFs have been produced and measured, an additional programming step is required for the IC associated with each coating PUF to store the appropriate quantization levels in a memory associated with the IC. This is a costly procedure in the production process.

OBJECT AND SUMMARY OF THE INVENTION

An object of the present invention is to address one or more of the above-mentioned problems and in particular to provide a physical token device for deriving a plurality of data sets from measurements of physical parameters that are provided by the physical token, without the need to test a large number of devices and program the test data into each device.

This object is achieved by a method of using a physical token, which provides measurable parameters, to derive at least one data set. This object is further achieved by a device comprising a physical token that provides measurable parameters, which device is arranged to derive at least one data set from the 1 measurable parameters.

This object is achieved by a method of using a physical token, which provides measurable parameters, to derive at least one data set in accordance with claim 1. This object is further achieved by a device comprising a physical token that provides measurable parameters, which device is arranged to derive at least one data set from the measurable parameters, in accordance with claim 17.

In a first aspect of the invention, there is provided a method comprising the steps of measuring a plurality of values of at least one of the parameters provided by the physical token and calculating, from the measured values, a measure of variance. Further, the method comprises the steps of storing information which enables determination of quantization intervals and determining, based on said measure of variance, quantization intervals into which a measured value is to be quantized, each quantization interval being associated with a possible value of a data set. Moreover, the method comprises the step of measuring a value of the at least one parameter and quantizing the measured value into a determined quantization interval, wherein a data set is derived from a value associated with the quantization interval into which the measured value is quantized.

In a second aspect of the invention, there is provided a device comprising means for measuring a plurality of values of at least one of the parameters provided by the physical token and means for storing information which enables determination of quantization intervals. Further, the device comprises means for calculating, from the measured values, a measure of variance, and for determining, based on said measure of variance, quantization intervals into which a measured value is to be quantized, each quantization interval being associated with a possible value of a data set. Moreover, the measuring means are further arranged to measure a value of the at least one parameter and quantizing the measured value into a determined quantization interval, wherein a data set is derived from a value associated with the quantization interval into which the measured value is quantized.

A basic idea of the invention is to use a physical token, such as a physical uncloneable function (PUF), which provides measurable parameters from which data sets may be derived. First, a plurality of values of one or more of the parameters is measured. From these measured values, a measure of variance is calculated. As will be described in the following, a number of different measures of variance may be calculated. After determining the variance, quantization intervals into which a measured value is to be quantized are determined. A possible value of a data set, which subsequently can be derived from a measured value provided by the physical token, is associated with each quantization interval. Further, information which subsequently enables determination of these quantization intervals is stored. This information may for instance comprise the variance itself, definition of the quantization intervals, a description of how to perform quantization, etc. Hence, a preparing/enrolling phase has been completed.

When the preparing phase has been completed, a deriving phase may commence. When a data set is to be derived, for example to be used as a cryptographic key, a value of any one of the parameters provided by the PUF is measured. This measured value is quantized into a determined quantization interval, which may be determined from the information which enables quantization interval determination, and since values of possible data sets are associated with quantization intervals as mentioned in the above, a data set may be derived from the quantization interval into which the measured value is quantized. For instance, assuming that eight quantization interval are determined, and that each interval is associated with a corresponding numerical value 0, 1, . . . , 7; data sets based on these values may be derived. For example, eight three-bit data sets are derived: "000", "001", . . . , "111". In embodiments of the invention, the variance calculated from measured values comprise interclass variance, intraclass variance or both. In some devices, the interclass variance is known, and the intraclass variance is measured. In other devices, the intraclass variance may be known in advance, and the interclass variance is calculated.

Further, the different types of variances may be calculated with respect to a mean value (or possibly a median value). This mean value may have to be calculated from the measured values, but it may also be known in advance and thus prestored in a device. A skilled person realizes that there exist a great number of degrees of freedom regarding this matter. It is further realized that measured and/or calculated values may be stored in the device, but the values may alternatively be stored outside the device if they are properly protected, e.g. by using cryptography.

In other embodiments of the present invention, self-calibration of a device comprising a PUF is enabled for deriving data sets on which creation of e.g. identifiers or cryptographic keys may be based. The device repeatedly measures physical parameters provided by the PUF and estimates interclass distribution of the measured values. Before quantizing the measured values into intervals from which the data sets are derived, intraclass variation of the measured values is taken into account, as will be described in the following.

The interclass distribution is defined as the distribution of values taken from different classes and the intraclass distribution is defined as the distribution of values taken from the same class. For instance, the physical token may comprise a PUF embodied in the form of a coating covering an integrated circuit (IC), and the capacitance at different positions of the coating is measured by sensors arranged at the IC. Note that this is merely exemplifying and that the PUF may come in other forms. For instance, the PUF may be implemented in the form of an optical medium provided with randomly located light scattering elements. When the PUF is illuminated, incident light is scattered and detected. The detected light pattern is then employed to create data sets from which e.g. cryptographic keys may be derived. A skilled person realizes that still other types of PUFs may be employed. However, in the following, the PUF will embodied in the form of a coating. The interclass distribution of such a coating PUF is hence defined as the distribution of values taken from different capacitors of the PUF and the intraclass distribution is defined as the distribution of values taken from the multiple measurements of the same capacitor of the PUF.

For instance, assume that a coating PUF power supply is designed to provide capacitances of 4, 5, 6 and 7 picofarads. These are four different classes of capacitances, and an interclass distribution of capacitances is hence attained. In the first class, the expected value is 4 pF, in the second it is 5 pF and so on. The mean value and the standard deviation for this particular set of values are $$\mu = \frac{4+5+6+7}{4} = 5.5 \text{ and}$$

$$\sum = \sqrt{\frac{(4-5.5)^2 + (5-5.5)^2 + (6-5.5)^2 + (7-5.5)^2}{3}} \approx 1.29$$

If an appropriate instrument is employed for measuring these capacitances, and every capacitance class is measured e.g.

three times, one would discover that there is a spread in the measurements of e.g. the 4-pF capacitor, which possibly would result in the values 4.01 pF, 4.02 pF and 3.99 pF. Hence, for the expected nominal value of 4 pF, there exists an intraclass distribution for the measured values. The mean value and the standard deviation for the expected 4-pF value is $$\mu_4 = \frac{3.99 + 4.01 + 4.02}{3} \approx 4.01 \text{ and}$$

$$\sigma = \sqrt{\frac{(3.99 - 4.01)^2 + (4.01 - 4.01)^2 + (4.02 - 4.01)^2}{2}} \approx 0.015.$$

Now, a plurality of values of the parameter(s) provided by the physical token are measured. After having measured a plurality of capacitance values, an interclass mean value and a measure of interclass deviation from the interclass mean value is calculated from the measured values. For instance, standard deviation may be used as the measure of deviation from the calculated mean value. Further, a width of a smallest quantization interval is acquired. The smallest width is based on a measure of intraclass deviation with respect to an intraclass mean value of the measured values. In analogy with the interclass deviation, standard deviation is a measure that may be employed for the intraclass deviation. A trade-off must be made when determining the width of quantization intervals. It is not desirable that the intraclass distribution extends over more than one quantization interval. If that is the case, it is likely that multiple capacitance measurements at the same position of the coating will result in different sets of quantized data, and ultimately in different cryptographic keys, which is undesirable. Hence, the smallest quantization interval width should preferably accommodate most of the intraclass variation. On the other hand, the wider the quantization intervals, the lesser the total number of quantization intervals.

Then, based on probability mass of the smallest quantization interval, which is determined by means of the interclass distribution, i.e. the interclass mean value and the interclass deviation from this mean value, the number of quantization intervals into which measured values are to be quantized are determined. The probability mass of the smallest quantization interval is determined by means of calculating an area of the smallest interval, which is bounded by a probability density function of the measured values and the two capacitance values which delimit the smallest quantization interval. After the number of intervals have been determined, the measured values are quantized into these intervals, and each quantization interval represents a data set. For instance, assuming that the measured values are quantized into 8 intervals, each interval may represent a three-bit data set.

Hence, the device comprising the PUF measures the physical parameter provided by the PUF and advantageously determines the interclass variation of these measured values. It can be assumed that the distribution of capacitance values measured at different positions of a particular device—i.e. the interclass distribution—is statistically equal to interclass distribution measured over different devices. As a consequence, there is no need to apply a complicated and costly procedure of first producing a large number PUF devices and then measuring the interclass variation of each PUF and storing the measure variation in each device, as is done in the prior art.

In an embodiment of the present invention, the width of the smallest quantization interval is a predetermined value which is programmed into the device comprising the PUF. Hence, the width of the smallest quantization interval is acquired by fetching the value from a storage in the device. As has been described in the above, a number of parameters essential for calculating quantization intervals may be pre-stored in the device.

In another embodiment of the present invention, the device determines the width of the smallest quantization interval by calculating the intraclass variation of the measured values. An intraclass standard deviation with respect to an intraclass mean value can be estimated by repeatedly measuring capacitance at a single position of the coating and calculating the standard deviation from these measurements as has been illustrated in the above. In an alternative embodiment, the device can average the intraclass standard deviation over several positions of the coating to attain an estimate of average deviation for a device. In further embodiments of the present invention, the quantization intervals are determined in such a manner that the intervals are arranged to be equiprobable or equidistant. Other known appropriate manners in which quantization may be undertaken are also possible.

Advantageously, the provided physical token device is self-calibrating with respect to interclass variations and/or intraclass variations in measurements of the physical parameters.

Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

A detailed description of preferred embodiments of the present invention will be given in the following with reference made to the accompanying drawings, in which.

DESCRIPTION OF EMBODIMENTS

Figure 1:
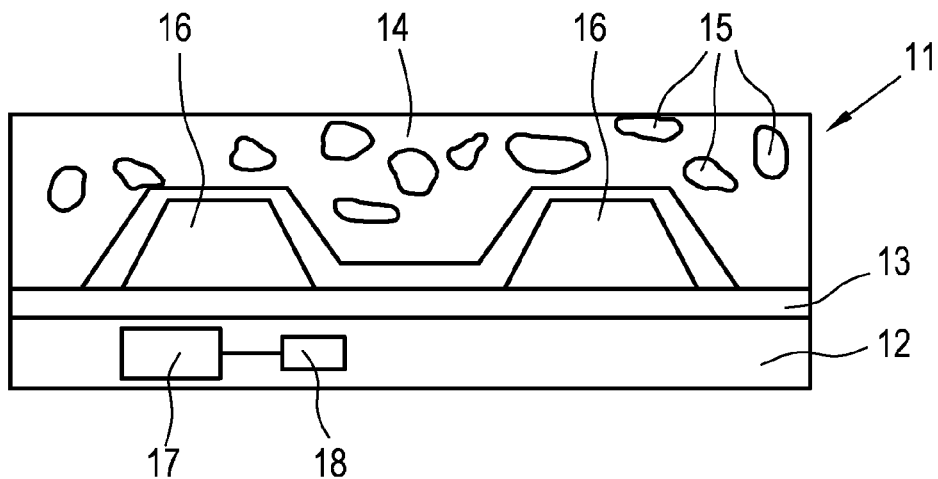
FIG. 1 shows a device for generating cryptographic key material according to an embodiment of the present invention.

FIG. 1 shows a device 11 for generating cryptographic key material according to an embodiment of the invention. The device 11 comprises an integrated circuit (IC) that consists of a semiconductor wafer 12, an insulating layer 13 and sensor elements 16. Further, the device comprises a physical uncloneable function (PUF) in the form of a coating 14 covering the IC. In the coating 14, dielectric particles 15 are interspersed. These particles typically have different dielectric constants and are of random size and shape. The sensor elements 16 are arranged at the insulating top metal layer 13 for locally measuring capacitance values at different coating positions. The device 11 is typically arranged with an input via which data can enter, and an output via which encrypted/decrypted (and possibly signed) data can be provided. Alternatively, the device 11 may receive encrypted data as input data and output decrypted data. The device 11 also comprises a microprocessor 17 or some other appropriate device with computing capabilities. The microprocessor is, for instance, employed to determine quantization intervals and derive data sets from measured values. Further, the device 11 comprises storing means 18. A skilled person realizes that there exist a great number of combinations regarding inputting and/or outputting data which is encrypted/decrypted or in any other appropriate manner processed.

When converting measured capacitance values into bit strings from which cryptographic keys may be derived, it is advantageous if the bit strings are uniformly distributed. Hence, if m-bit key strings are derived by the IC, all possible m-bit strings should be equally probable. If that is the case, the best an attacker can do is to guess a correct key with a probability $2^{-m}$.

Figure 2:
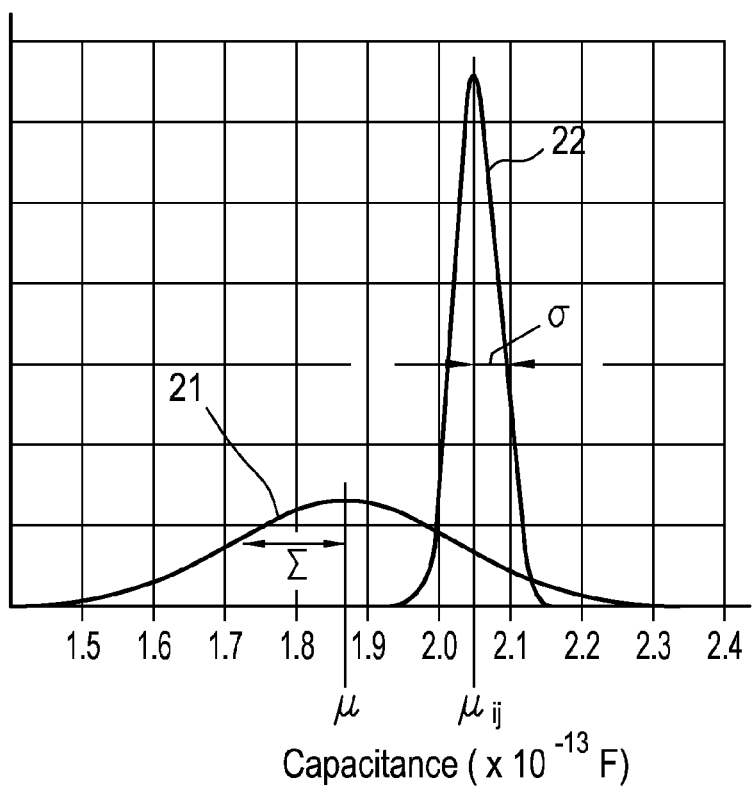
FIG. 2 shows probability density functions for interclass and intraclass capacitance measurements.

With reference to FIG. 2, the interclass distribution of measured capacitance values will not be uniform, but typically Gaussian with a mean value $\mu$ and standard deviation $\Sigma$. Further, the distribution of capacitance values measured at a certain coating location i of a certain PUF j—i.e. the intraclass distribution—also follows a normal distribution with a mean $\mu_{ij}$ and standard deviation $\sigma$. It is assumed that the standard deviation $\sigma$ is essentially the same for all PUFs and all coating locations. FIG. 2 shows probability density functions for interclass and intraclass capacitance measurements, respectively. The probability density function of the interclass measurements is denoted 21 and the probability density function of the intraclass measurements is denoted 22. Note that these are not probability density functions derived from real measurements. For illustration purposes, the variance of each of the functions (in particular for the intraclass measurements) has been exaggerated even though the functions possibly could be a result of actual measurements having a relatively large spread.

The probability density function (PDF) for a normal Gaussian distribution f(x) having a mean value $\mu$ and standard deviation $\sigma$ is defined as:

$$f_{\mu,\sigma}(x) = \frac{1}{\sigma\sqrt{2\pi}} e^{\frac{-(x-\mu)^2}{2\sigma^2}}.$$

Figure 3:
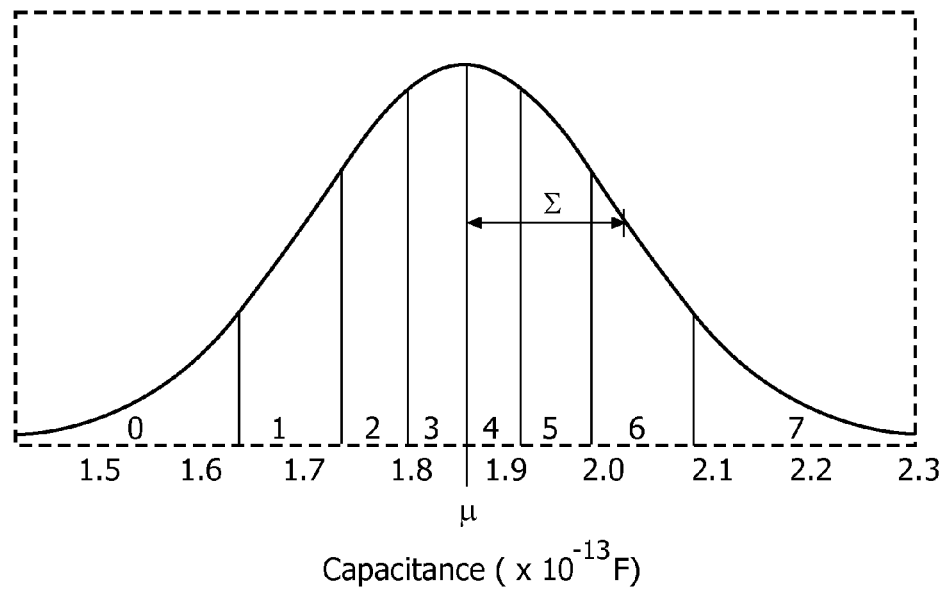
FIG. 3 shows normal distributed measurements being quantized into eight different quantization intervals.

The device 11 measures capacitance at a number of different locations i. The interclass mean value $\mu$ of the measured capacitance values $C_i$ is calculated as:

$$\mu = \frac{1}{n}\sum_{i=1}^{n} C_i,$$

and the interclass variance in capacitance is calculated as:

$$\sum{}^2 = \frac{1}{n-1}\sum_{i=1}^{n}(C_i - \mu)^2,$$

where n is the total number of measured capacitance values. One manner in which uniform keys may be created is to map the measured capacitance values into equiprobable intervals. In FIG. 3, eight intervals numbered 0-7 are defined. A 3-bit cryptographic key can be associated with each of the intervals by means of binary representation: "000", "001", . . . "111". The quantization intervals are preferably chosen such that the area under the probability density function is equal for each interval. Thus, when a PUF is measured, each possible key has the same probability of being derived.

As previously has been described, when a measurement at a particular position of a particular coating PUF is repeated multiple times, the measured capacitance values will differ as a result of measurement noise such as temperature variations, etc, even though they theoretically should be identical. By way of example we assume that the intraclass distribution of capacitance values measured at a certain coating location i of a certain PUF j follows a Gaussian distribution with a mean $\mu_{ij}$ and standard deviation $\sigma$. To provide the quantization of keys with robustness, this intraclass distribution of measured values is taken into account. Preferably, the intraclass distribution of measured values should not extend over more than one quantization interval, since multiple capacitance measurements at the same position of the coating then will result in different cryptographic keys. Further, the intraclass standard deviation can be averaged over several coating positions.

Figure 4:
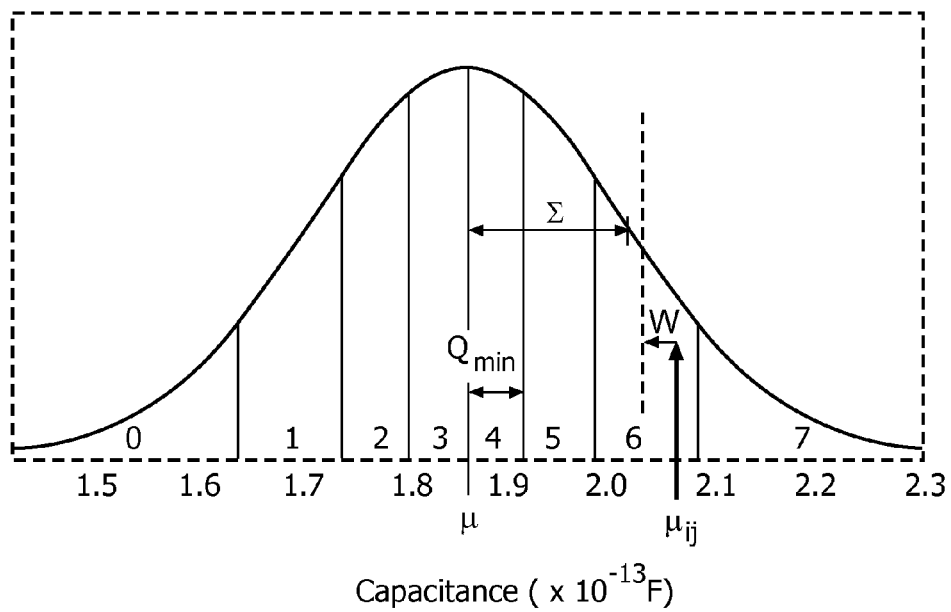
FIG. 4 illustrates normal distributed measurements being quantized into eight different quantization intervals, and further how helper data is employed to compensate for intraclass variations.

With reference to FIG. 4, for each coating position, compensation data referred to as helper data W is defined. The respective helper data W is added to (or subtracted from) each measured capacitance value such that the measured capacitance value on average is projected onto a center of a quantization interval. By adding the helper data W, the mean value $\mu_{ij}$ of the intraclass distribution for this PUF position is shifted to the center of a nearest quantization interval (in this case the interval numbered "6"). Thus, the helper data W for a certain coating position is calculated as the difference between the estimated intraclass mean value $\mu_{ij}$ and the center of the nearest quantization interval. Further, the helper data is stored.

Further, the width $Q_{min}$ of the smallest quantization interval is chosen such that most of the probability density function of the intraclass variation fits into this interval. In this example, an even number of quantization intervals are employed. As a consequence, the intervals numbered 3 and 4 located around the interclass mean value $\mu$ are the smallest and equally wide. If the number of intervals would be odd, there would only be one smallest interval located around $\mu$, as will be described later in connection to FIG. 5.

Now, if $Q_{min}$ for example is chosen such that it equals $4.\sigma$ (i.e. four times the standard deviation of the intraclass variation), the probability of a correct reconstruction of a cryptographic key after applying the helper data W is at least 95%, since about 95% of the area under the intraclass probability density function fits into the smallest interval (i.e. interval 3 or 4 in this particular example).

Since the other quantization intervals in this particular example (intervals 0, 1, 2, 5, 6 and 7) have a larger width, the probability of correct reconstruction (i.e. the probability that a measured capacitance is quantized correctly) is even larger in those intervals. Typically, $Q_{min}$ is chosen such that at least 90% of the probability mass of the intraclass distribution is accommodated in the smallest quantization interval. Hence, by considering the statistical properties of the intraclass distribution, which in practice is implemented by choosing an appropriate smallest quantization interval width $Q_{min}$, a confidence interval may be determined for reliable key reconstruction. The statistical properties of the intraclass distribution may further be considered by means of creating helper data W and using the data to compensate for the intraclass variation as is described hereinabove.

In a device 11 for generating cryptographic key material as shown in FIG. 1, it may be the case that the intraclass variation mainly depends on the design of the IC (and in particular the semiconductor wafer 12) and not on the actual coating. In that case, as an alternative to having the device 11 actually measure the intraclass variation, the intraclass variation or the smallest interval width $Q_{min}$ can be provided by means of a fixed value that is stored in the IC during manufacturing.

To further increase noise robustness in the quantization process, error correcting coding can be applied. This is commonly employed when extracting keys from biometrics and is understood by a skilled person in this technical field.

The boundaries of the quantization intervals can be calculated based on the smallest quantization interval width $Q_{min}$, the interclass mean value p and the interclass standard deviation $\Sigma$. The smallest width $Q_{min}$ is defined relative to the intraclass standard deviation as $Q_{min}=2\ k\sigma$, where k is an appropriately selected constant. The quantization interval boundaries can now be determined by defining a total number N of quantization intervals as the integer part of (1/probability mass of the smallest interval). The probability mass of the smallest interval is calculated as the integral of the probability density function $f_{\mu,\Sigma}(x)$ over the width of the smallest interval and is sometimes, in case of a Gaussian distribution, referred to as the error function Erf(x). The total number N of equiprobable quantization intervals is hence defined as:

$$N = \left[1 \Big/ \left(\int_{\mu-k\sigma}^{\mu+k\sigma} f_{\mu,\Sigma}(x)\right)\right] = \left[1 \Big/ \mathrm{Erf}\left(\frac{k\sigma}{\sum\sqrt{2}}\right)\right]$$

The probability of quantizing a measured capacitance value into a correct quantization interval (i.e. the probability of reconstructing a correct key) is given by $$1 - \mathrm{Erf}\left(\frac{k\sigma}{\sum\sqrt{2}}\right).$$

The error function $\mathrm{Erf}(k\sigma/\Sigma\sqrt{2})$ defines the probability that a measured capacitance whose intraclass mean value lies at the center of the smallest quantization interval ends up in a different (i.e. incorrect) quantization interval.

Figure 5A:
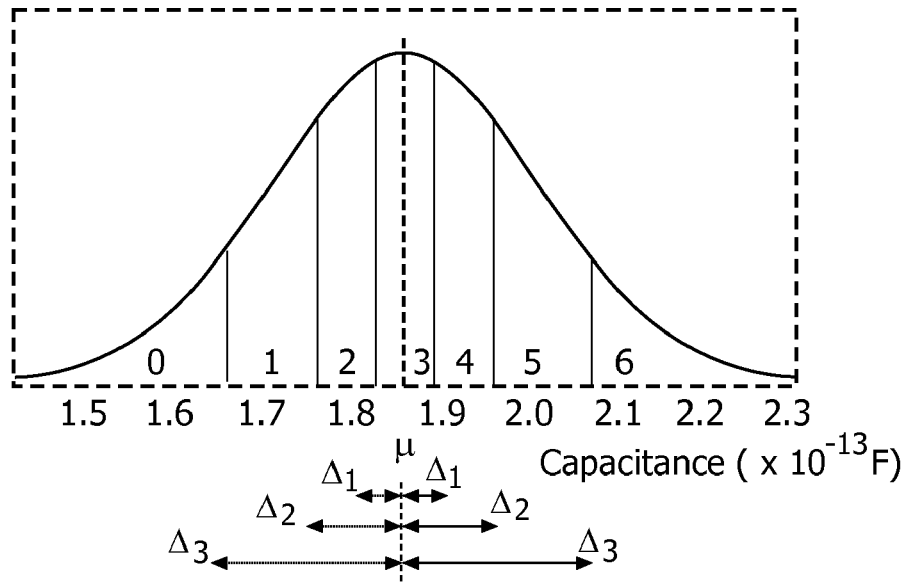
FIG. 5a shows normal distributed measurements being quantized into seven different quantization intervals.
Figure 5B:
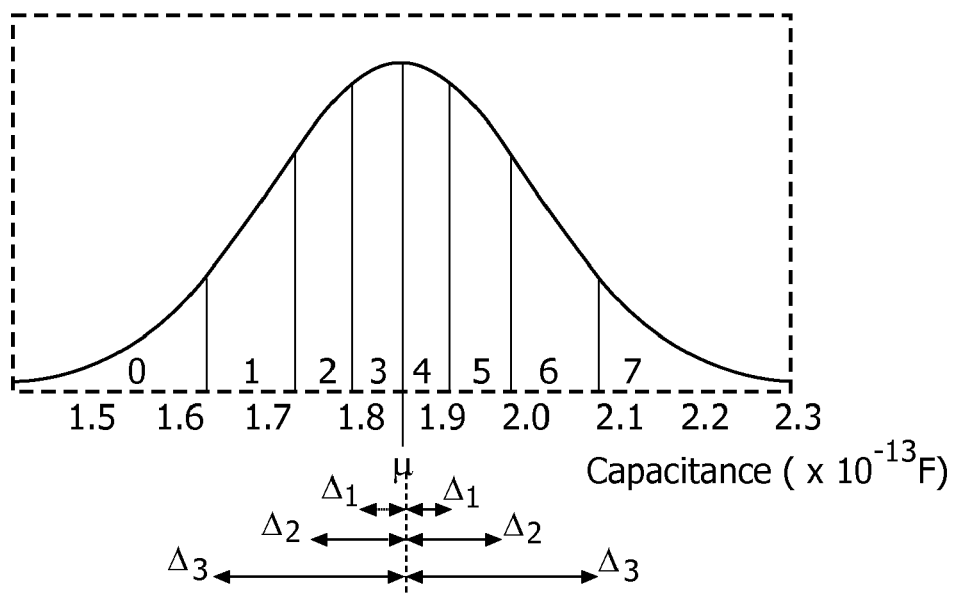
FIG. 5b shows normal distributed measurements being quantized into eight different quantization intervals.

With reference to FIG. 5, when defining the boundaries of the quantization intervals, two cases are distinguished. In FIG. 5a, the probability density function is quantized into an odd number of quantization intervals (N=2 p+1). In FIG. 5b, the probability density function is quantized into an even number of quantization intervals (N=2 p). A distance $\Delta_r$ is defined as the distance between the mean value $\mu$ and the r-th quantization interval boundary. For an odd number of quantization intervals, the following equation holds:

$$\frac{1}{2}\mathrm{Erf}\left(\frac{\Delta_r}{\sum\sqrt{2}}\right) = \frac{r-1/2}{N} \Leftrightarrow \Delta_r = \sum \sqrt{2} * \mathrm{Erf}^{-1}\left(\frac{2(r-1/2)}{N}\right),$$

$$r \in \{1, \ldots, p\}.$$

For an even number of quantization intervals, the following equation holds:

$$\frac{1}{2}\mathrm{Erf}\left(\frac{\Delta_r}{\sum\sqrt{2}}\right) = \frac{r}{N} \Leftrightarrow \Delta_r = \sum \sqrt{2} * \mathrm{Erf}^{-1}\left(\frac{2r}{N}\right), r \in \{1, \ldots, p-1\}.$$

As an alternative to equiprobable quantization intervals, equidistant quantization intervals may be employed (i.e. the width of the intervals is the same for all intervals).

Now, when the quantization intervals have been determined, they may be used to derive cryptographic keys from measured capacitance values. In the particular example illustrated in FIG. 3, it can be seen that a measured capacitance value which lies in the range extending roughly from 16.4 to 17.4 pF will be quantized into quantization interval 1. A data set comprising the binary digits "001" represents this particular interval, and a cryptographic key based on this data set may hence be created. A measured capacitance value lying in the range extending roughly from 19.7 to 20.7 pF will be quantized into quantization interval 6. Analogously, a data set comprising the binary digits "110" may represent this particular interval.

Hence, the device 11 comprising the PUF 14 (in the form of a coating) illustrated in FIG. 1 uses its sensor elements 16 to measure the capacitance of the coating and advantageously determines the interclass variation of these measured values. It can be assumed that the distribution of capacitance values measured at different positions of a particular device is statistically equal to distribution measured over different devices. As a consequence, there is no need to apply a complicated and costly procedure of first producing a large number of PUF devices and then measuring the interclass variation of each PUF and storing the measured variation in each device.

The proposed procedure for on-chip estimation of the interclass parameters $\mu$ and $\Sigma$ (and possibly also the intraclass parameters $\mu_{ij}$ and $\sigma$), can also be used to detect tampering or damaging of the PUF. The parameters are stored in the IC of the device 11 during an enrollment phase. Subsequently, the IC can repeat the self-calibration procedure and calculate new estimates of mean values and standard deviations. If these new estimates differ considerably from the parameters attained during enrollment, it is likely that the PUF has been damaged or tampered with. If that is the case, the IC should stop further actions and communicate via its output that it has been damaged and/or tampered with.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method of using a physical token, which provides measurable parameters, to derive at least one data set, the method comprising the steps of:
   measuring a plurality of values of at least one of said parameters provided by the physical token;
   calculating, from the measured values, a measure of variance;
   storing information which enables determination of quantization intervals;
   determining, based on said measure of variance, quantization intervals into which a measured value is to be quantized, each quantization interval being associated with a possible value of a data set; and measuring a value of said at least one parameter and quantizing the measured value into a determined quantization interval, wherein a data set is derived from a value associated with the quantization interval into which the measured value is quantized;

wherein a plurality of measurements are made for at least one selected parameter and an intraclass variance is calculated from the measured values of the respective at least one selected parameter.

2. The method according to claim 1, wherein said information that enables determination of quantization intervals comprises a measure of variance.

3. The method according to claim 1, wherein said information that enables quantization interval determination comprises a quantization interval definition.

4. The method according to claim 1, wherein a plurality of parameters are measured and an interclass variance is calculated from the measured values.

5. The method according to claim 4, further comprising the step of:
acquiring an interclass mean value.

6. The method according to claim 1, further comprising the step of:
acquiring an intraclass mean value.

7. The method according to claim 6, further comprising the steps of:
calculating a difference between an intraclass mean value and a center value of a quantization interval; and
adding or subtracting said difference to a corresponding measured value.

8. The method according to claim 6, wherein an interclass mean value and interclass variance are stored during an enrollment phase and the method further comprises the step of:
measuring further values of said at least one parameter provided by the physical token and calculating an interclass mean value and an interclass variance for said further values; and
comparing the interclass mean value and the interclass variance of said further values with the interclass mean value and the interclass variance stored during enrollment.

9. The method according to claim 6, wherein the physical token is a physical uncloneable function.

10. The method according to claim 1, wherein the step of determining quantization intervals further comprises the step of:
acquiring a width of at least one quantization interval.

11. The method according to claim 10, wherein the step of determining quantization intervals further comprises the step of:
determining equiprobable quantization intervals.

12. The method according to claim 10, wherein the step of determining quantization intervals further comprises the step of:
determining equidistant quantization intervals.

13. The method according to claim 10, further comprising the step of:
storing a predetermined value of the width of said at least one quantization interval.

14. The method according to claim 1, further comprising the step of:
averaging an intraclass variance over a plurality of intraclass variances for the plurality of measurements of said at least one selected parameter.

15. The method according to claim 1, further comprising the step of:
selecting a greatest intraclass variance from the plurality of measurements of said at least one selected parameter.

16. A computer program product comprising non-transitory computer-executable components for causing a device to perform the steps recited in claim 1 when the non-transitory computer-executable components are run on a processing unit included in the device.

17. A device comprising a physical token that provides measurable parameters, said device being arranged to derive at least one data set from said measurable parameters, the device further comprising:
means for measuring a plurality of values of at least one of said parameters provided by the physical token;
means for storing information which enables determination of quantization intervals;
means for calculating, from the measured values, a measure of variance, and for determining, based on said measure of variance, quantization intervals into which a measured value is to be quantized, each quantization interval being associated with a possible value of a data set; and wherein
said means for measuring further are arranged to measure a value of said at least one parameter and quantizing the measured value into a determined quantization interval, wherein a data set is derived from a value associated with the quantization interval into which the measured value is quantized;
wherein the measuring means are arranged to perform a plurality of measurements of at least one selected parameter and the calculating means is arranged to calculate an intraclass variance from the measured values of the respective at least one selected parameter.

18. The device according to claim 17, wherein the measuring means are arranged to measure a plurality of parameters and the calculating means is arranged to calculate an interclass variance from the measured values.

19. The device according to claim 17, wherein the means for determining quantization intervals further is arranged to determine equiprobable quantization intervals.

20. The device according to claim 17, wherein the means for determining quantization intervals further is arranged to determine equidistant quantization intervals.

21. The device according to claim 17, wherein the storing means further is arranged to store a predetermined value of the width of a quantization interval.

22. The device according to claim 17, wherein the calculating means further is arranged to average an intraclass variance over a plurality of intraclass variances for the plurality of measurements of said at least one selected parameter.

23. The device according to claim 17, wherein the calculating means further is arranged to select a greatest intraclass variance from the plurality of measurements of said at least one selected parameter.

24. The device according to claim 17, wherein the calculating means further is arranged to calculate a difference between an intraclass mean value and a center value of a quantization interval and add or subtract said difference to a corresponding measured value.

25. The device according to claim 17, wherein the storing means further is arranged to store an interclass mean value and interclass variance during an enrollment phase, the measuring means are arranged to measure further values of said at least one parameter provided by the physical token and the calculating means is arranged to calculate an interclass mean value and an interclass variance for said further values, and compare the interclass mean value and the interclass variance of said further values with the interclass mean value and the interclass variance stored during enrollment.

26. The device according to claim 17, wherein the physical token is a physical uncloneable function.

* * * * *